(12) United States Patent
Zomet (10) Patent No.: US 9,576,401 B2
(45) Date of Patent: Feb. 21, 2017

(54) METHODS AND SYSTEMS OF REDUCING BLURRING ARTIFACTS IN LENTICULAR PRINTING AND DISPLAY

(75) Inventor: Assaf Zomet, Jerusalem (IL)

(73) Assignee: HumanEyes Technologies Ltd., Neve Ilan (IL)

( * ) Notice: Subject to any disclaimer, the term of this patent is extended or adjusted under 35 U.S.C. 154(b) by 433 days.

(21) Appl. No.: 13/980,906

(22) PCT Filed: Jan. 22, 2012

(86) PCT No.: PCT/IB2012/050289
§ 371 (c)(1),
(2), (4) Date: Jul. 22, 2013

(87) PCT Pub. No.: WO2012/098530
PCT Pub. Date: Jul. 26, 2012

(65) Prior Publication Data
US 2013/0293576 A1    Nov. 7, 2013

Related U.S. Application Data

(60) Provisional application No. 61/435,296, filed on Jan. 22, 2011.

(51) Int. Cl.
*H04N 13/00* (2006.01)
*H04N 13/04* (2006.01)
(Continued)

(52) U.S. Cl.
CPC .............. *G06T 19/20* (2013.01); *G09G 5/14* (2013.01); *H04N 13/0007* (2013.01);
(Continued)

(58) Field of Classification Search
CPC ............ G02B 27/2214; H04N 13/0404; H04N 13/0018; H04N 1/00201
See application file for complete search history.

(56) References Cited

U.S. PATENT DOCUMENTS 9,361,717 B2 * 6/2016 Zomet ..................... G06T 11/60
2006/0268104 A1 11/2006 Cowan et al.
(Continued)

FOREIGN PATENT DOCUMENTS

GB       2404106        1/2005
JP    2009-507401       2/2009
(Continued)

OTHER PUBLICATIONS

Communication Pursuant to Article 94(3) EPC Dated Apr. 30, 2015 From the European Patent Office Re. Application No. 12704913.8.
(Continued)

*Primary Examiner* — Gregory J Tryder
*Assistant Examiner* — Scott E Sonners (57) ABSTRACT

A method of creating an interlaced composite image. The method comprises receiving a plurality of images selected for generating an interlaced composite image by interlacing a plurality of image strips from each image, providing a filter as a function of an approximate inverse transform of an undesired distortion dataset representing at least one estimated undesired distortion caused by an autostereoscopic display element when a user views the interlaced composite image via the autostereoscopic display element, generating a reduced artifact interlaced composite image by applying the filter on the plurality of images, and outputting the reduced artifact interlaced composite image.

20 Claims, 6 Drawing Sheets

(51) Int. Cl.
    *G09G 5/14*     (2006.01)
    *G06T 19/20*    (2011.01)
(52) U.S. Cl.
    CPC ..... *H04N 13/0018* (2013.01); *H04N 13/0404*
        (2013.01); *H04N 13/0409* (2013.01); *H04N*
                                    *13/0425* (2013.01)

(56) References Cited

U.S. PATENT DOCUMENTS

| | | | |
|---|---|---|---|
| 2007/0209250 A1* | 9/2007 | Lindemann | G09F 19/00 40/440 |
| 2010/0134493 A1 | 6/2010 | Kwak et al. | |
| 2010/0246019 A1 | 9/2010 | Booyens et al. | |
| 2010/0302237 A1 | 12/2010 | Aramaki | |

FOREIGN PATENT DOCUMENTS

| | | |
|---|---|---|
| JP | 2010-521081 | 6/2010 |
| JP | 2010-278703 | 12/2010 |
| WO | WO 2006/128066 | 11/2006 |
| WO | WO 2008/102366 | 8/2008 |
| WO | WO 2010/016061 | 2/2010 |
| WO | WO 2010016061 A1 * | 2/2010 |
| WO | WO 2012/098530 | 7/2012 |

OTHER PUBLICATIONS

International Preliminary Report on Patentability Dated Aug. 1, 2013 From the International Bureau of WIPO Re. Application No. PCT/IB2012/050289.

International Search Report and the Written Opinion Dated Apr. 25, 2012 From the International Searching Authority Re. Application No. PCT/IB2012/050289.

Notice of Reason for Rejection Dated Oct. 16, 2015 From the Japanese Patent Office Re. Application No. 2013-549927 and Its Translation Into English.

Notice of Reason for Rejection Dated Apr. 1, 2016 From the Japanese Patent Office Re. Application No. 2013-549927 and Its Translation Into English.

* cited by examiner

METHODS AND SYSTEMS OF REDUCING BLURRING ARTIFACTS IN LENTICULAR PRINTING AND DISPLAY

RELATED APPLICATIONS

This application is a National Phase of PCT Patent Application No. PCT/IB2012/050289 having International filing date of Jan. 22, 2012, which claims the benefit of priority under 35 USC §119(e) of U.S. Provisional Patent Application No. 61/435,296, filed on Jan. 22, 2011. The contents of all of the above documents are incorporated by reference as if fully set forth herein.

FIELD AND BACKGROUND OF THE INVENTION

The present invention, in some embodiments thereof, relates to autostereoscopic displays and, more particularly, but not exclusively, to an apparatus and a method for reducing artifacts in autostereoscopic displays.

In recent years, there has been rapid improvement in graphics display techniques aimed at providing a perception of three dimensions and other optical illusions. Three dimensional images displayed on a two-dimensional screen using conventional display technology contain limited three dimensional cues such as obscuration, depth effect, and illumination effects. For enhanced three dimensional displays, special architectures depart from conventional two dimensional displays.

Common three dimensional (3D) displays, also referred to as auto-stereoscopic displays, provide 3D visualization without requiring the user to wear glasses or other devices. Of special interest are auto-stereoscopic displays that use optics such as lenticular lenses, a lenticular mask, and parallax barrier to direct a set of views to different angles. This type of displays is by far the most common in print as well as in digital displays such as computer monitors, mobile devices and recently also television sets.

Another type of product that provides a 3D visualization without requiring the user to wear glasses or other devices are lenticular printing articles. These articles are created in a process consisting of creating a composite interlaced composite image by interlacing various images, and attaching it with a lenticular lens arrangement, such as a sheet, to form a lenticular image article. When digitally processing the composite interlaced composite image, various images are collected are flattened into individual, different frame files, and then digitally combined by interlacing into a single final file in a process which may be referred to herein as interlacing. The lenticular printing can be used to create a dynamic image, for example by offsetting the various layers at different increments in order to give a 3D effect to the observer, various frames of animation that gives a motion effect to the observer, a set of alternate images that each appears to the observer as transforming into another. One of the most common methods of lenticular printing, which accounts for the vast majority of lenticular images in the world today, is lithographic printing of the composite interlaced composite image directly onto lower surface of a lenticular lens sheet.

SUMMARY OF THE INVENTION

According to some embodiments of the present invention, there is provided a method of creating an interlaced composite image. The method comprises receiving a plurality of images selected for generating an interlaced composite image by interlacing a plurality of image strips from each image, providing a filter as a function of an approximate inverse transform of an undesired distortion dataset representing at least one estimated undesired distortion caused by an autostereoscopic display element when a user views the interlaced composite image via the autostereoscopic display element, generating a reduced artifact interlaced composite image by applying the filter on the plurality of images, and outputting the reduced artifact interlaced composite image.

Optionally, the undesired distortion dataset is a matrix having a plurality of values each representing at least one estimated undesired distortion caused by the autostereoscopic display element to a respective pixel of the interlaced composite image.

Optionally, the at least one estimated undesired distortion comprises a ghosting artifact.

Optionally, the at least one estimated undesired distortion comprises a depth dependent blur.

Optionally, the at least one estimated undesired distortion comprises a cross-talk effect.

Optionally, the method further comprises presenting to a user a calibration pattern via the autostereoscopic display and receiving the at least one estimated undesired distortion from the user in response to the presenting.

Optionally, the method further comprises identifying a location of at least one observer in relation to the autostereoscopic display and estimating the at least one estimated undesired distortion according to the location.

Optionally, the method further comprises identifying an illumination level in proximity to the autostereoscopic display and estimating the at least one estimated undesired distortion according to the illumination level.

Optionally, the method further comprises receiving printing specification data pertaining to the printing of the reduced artifact interlaced composite image on the autostereoscopic display or on a medium which is attached thereto and estimating the at least one estimated undesired distortion according to the printing specification data.

Optionally, the providing comprises calculating the filter as a function an approximate inverse transform and the plurality of images.

Optionally, the generating is performed without analyzing the content of the plurality of images.

Optionally, the plurality of images is a video sequence and the outputting is performed in real time for three dimensional display of the video sequence.

Optionally, the interlaced composite image is projected on a lenticular mask for three dimensional display of content depicted in the plurality of images.

Optionally, the outputting comprises at least one of printing the interlaced composite image and projecting the interlaced composite image on an image separating mask.

Optionally, the outputting comprises attaching the interlaced composite image to a lenticular lens sheet having a plurality of lenslets.

Optionally, the generating comprises interlacing a plurality of reduced artifact image strips from each filter applied image and a plurality of separating strips in alternating manner.

More optionally, the generating comprises: creating a reverse intensity image wherein respective pixel color values of a pair of reduced artifact image strips are combined, and extracting the plurality of separating strips from the reverse intensity image.

According to some embodiments of the present invention, there is provided a method of reducing at least one artifact in an interlaced composite image. The method comprises receiving an interlaced composite image interlacing a plurality of image strips from each of a plurality of images, providing a filter as a function of an approximate inverse transform of an undesired distortion dataset representing at least one estimated undesired distortion caused by an autostereoscopic display element when a user views the interlaced composite image via the autostereoscopic display element, generating a reduced artifact interlaced composite image by applying the filter on the interlaced composite image, and outputting the reduced artifact interlaced composite image.

According to some embodiments of the present invention, there is provided a method a lenticular imaging article that comprises a lenticular lens sheet having a plurality of lenslets and a reduced artifact interlaced composite image having a plurality of image strips from each of a plurality of images. The reduced artifact interlaced composite image is generated by applying a filter on the plurality of images, the filter being calculated as a function of an approximate inverse transform of a undesired distortion dataset representing at least one estimated undesired distortion caused by the lenticular lens sheet when a user views a composite image interlacing the plurality of images via the lenticular lens sheet.

According to some embodiments of the present invention, there is provided a system having an autostereoscopic display element. The system comprises a processor, an autostereoscopic display element, an input unit which receives a plurality of images, a memory which stores a filter calculated as a function of an approximate inverse transform of an undesired distortion dataset representing at least one estimated undesired distortion caused by the autostereoscopic display element when a user views a composite image interlacing the plurality of images via the autostereoscopic display element, and a presentation unit which generates a reduced artifact interlaced composite image by applying the filter on the plurality of images and instructs the presentation of the reduced artifact interlaced composite image via the autostereoscopic display element.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to autostereoscopic displays and, more particularly, but not exclusively, to an apparatus and a method for reducing artifacts in autostereoscopic displays.

According to some embodiments of the present invention, there are provided methods and systems of creating a reduced artifact interlaced composite image using a filter generated as a function of an approximate inverse transform of an undesired distortion dataset, such as a vector, for example a matrix, representing one or more estimated undesired distortions caused by an autostereoscopic display element when a user views the interlaced composite image via the autostereoscopic display element.

The estimated undesired distortions include ghosting artifact(s), depth dependent blur(s), and/or a cross-talk artifact(s) (also called cross-talk effect(s)). The methods and systems may be used for adjusting projected interlaced composite image in real time and/or for adjusting interlaced composite image which are printed on lenticular articles.

The methods and systems may allow generating the reduced artifact interlaced composite image without an analysis of the content of the images from which the interlaced composite image is composed.

Optionally, the filter may be calibrated according to user inputs and/or dynamically adjusted in real time according to the location of one or more observers in relation thereto and/or according to illumination in the area thereinfront. Optionally, the filter may be adjusted according to printing specification data.

Optionally, the filter is a matrix having a plurality of values each representing a one or more estimated undesired distortions caused by the autostereoscopic display element to a respective pixel of the interlaced composite image.

The below also teaches a lenticular imaging article generated using the above outlined filter and a system with autostereoscopic display which display composite interlaced images with artifacts reduced by the above outlined filter.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
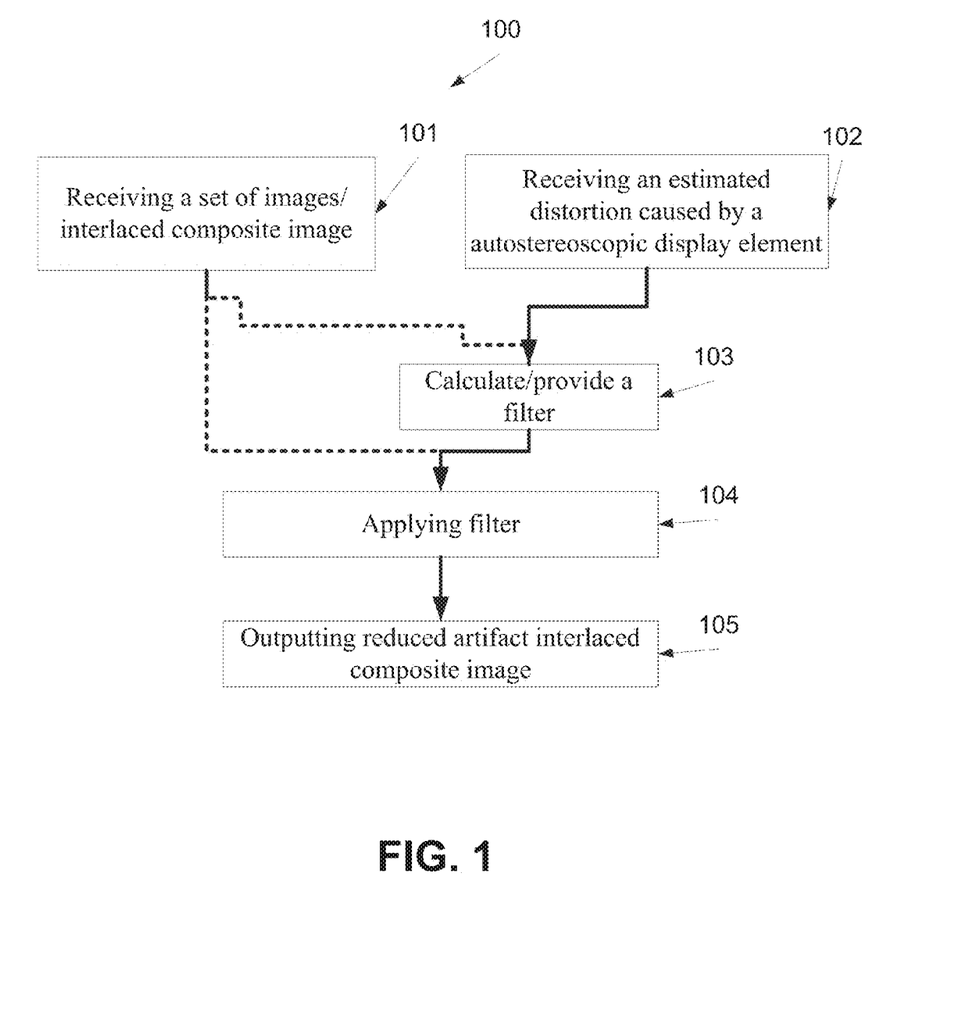
FIG. 1 is a schematic illustration of a method of using an approximate inverse transform to create a reduced artifact interlaced composite image designed to be displayed via and/or projected on an autostereoscopic display element, according to some embodiments of the present invention.

Reference is now made to FIG. 1, which is a schematic illustration of a method 100 of using an approximate inverse transform to create a reduced artifact interlaced composite image designed to be displayed via and/or projected on an autostereoscopic display element, according to some embodiments of the present invention. Optionally, the reduced artifact interlaced composite image is optionally used for creating a lenticular imaging article having reduced artifacts, such as ghosting and blurring. Additionally or alternatively, the method 100 may be to reduce the ghosting artifact, also referred to herein as a ghosting effect, an effect in an autostereoscopic display element of a video sequence by adjusting interlaced frames of a video sequence, referred to herein as images.

As further described below, the reduced artifact interlaced composite image generated by the method may have substantially reduced depth-dependent blur, which may be referred to as a crisp-sharp image. It should be noted that the reduced artifact interlaced composite image may be generated without an analysis of and/or information about the content depicted in the interlaced images. Therefore, the method may be applied to complex content including thin 3D structures, transparent objects, reflections and/or specularities, in relatively low computational complexity.

The method 100 is optionally stored as instructions on a computer-readable medium such as a floppy disk, a CD or disk-on-key, containing a set of instructions as a software application for creating a composite image interlacing a set of images, and/or the like.

First, as shown at 101, a plurality of images, for example 2, 3, 4, 5 or any larger number of images, are received, either as separate image or as a single interlaced composite image which is created from a number of images. For brevity, when the input of the process is referred to, received images and a received interlaced composite image may be referred to herein interchangeably. Optionally, when images are received, the images may be extracted, optionally automatically, from a sequence, such as a typical spatial-temporal signal for example a series of sequentially ordered images, a video sequence, or any other series of sequential images. In such an embodiment, the method may be executed to reduce known distortions of an autostereoscopic display element, such as parallax barrier, a lenticular display, a lenticular mask, and/or any optical element for displaying composite images, for example for 3D displays. The images may be selected to create a dynamic image, for example a set of offset images selected to give 3D effect to the observer, when interlaced, various frames of one or more moving objects that gives a motion effect to the observer, when interlaced, and/or a set of alternate images that are selected to appear, when interlaced, to the observer as transforming into another. The images may be extracted from a memory device, captured by an imaging device, received from a remote server, selected by a user, and/or created by a user.

Optionally, the received images are images selected for generating an interlaced composite image by interlacing image strips extracted therefrom, for example as known in the art. The interlaced composite image is designed to be presented via a certain autostereoscopic display element having certain physical properties which cause an estimated undesired distortion, such as blur, to an observer viewing the interlaced composite image via the autostereoscopic display element.

As shown at 102, an undesired distortion dataset, such as a vector or a matrix, is provided, for example stored in the memory of an executing system and/or received in use. The undesired distortion dataset represents one or more estimated undesired distortion(s) (for brevity, referred to herein as an estimated undesired distortion) caused by the certain autostereoscopic display element when the observer views the interlaced composite image via the autostereoscopic display element. Optionally, the undesired distortion dataset is a matrix wherein each value of the matrix represents a distortion caused to one or more pixels of an interlaced composite image that is presented via and/or projected on the certain autostereoscopic display element. Optionally, the undesired distortion dataset is a matrix wherein each value represents distortion(s) caused to a different pixel of an interlaced composite image presented via the certain autostereoscopic display element.

Figure 2:
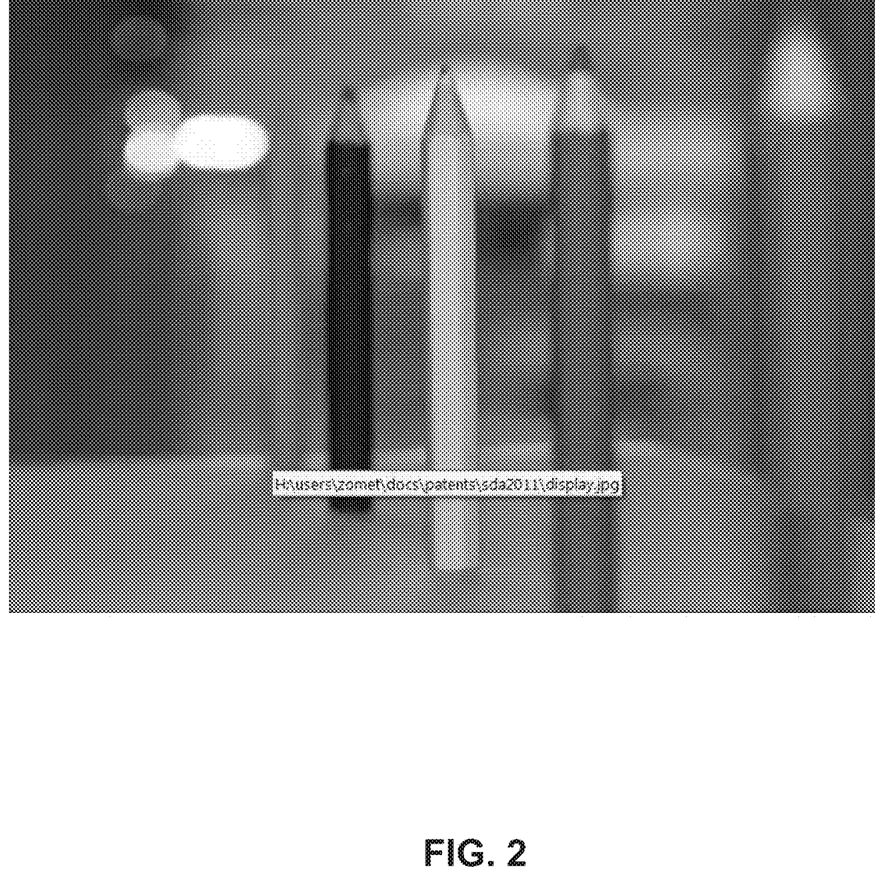
FIG. 2 is an image illustrating a typical blurriness in a certain auto-stereoscopic display where objects in depth appear blurry, with the extent of blur of a particular object growing with depth.

For example, the estimated undesired distortion represented by the undesired distortion dataset is a depth dependent blur. Auto-stereoscopic displays are inherently limited by a range of depth they present clearly. FIG. 2 is an image illustrating a typical blurriness in a certain auto-stereoscopic display where objects in depth appear blurry, with the extent of blur of a particular object growing with depth. The result is degradation of the quality of the displayed image as well as the quality of depth perception.

Figure 3:
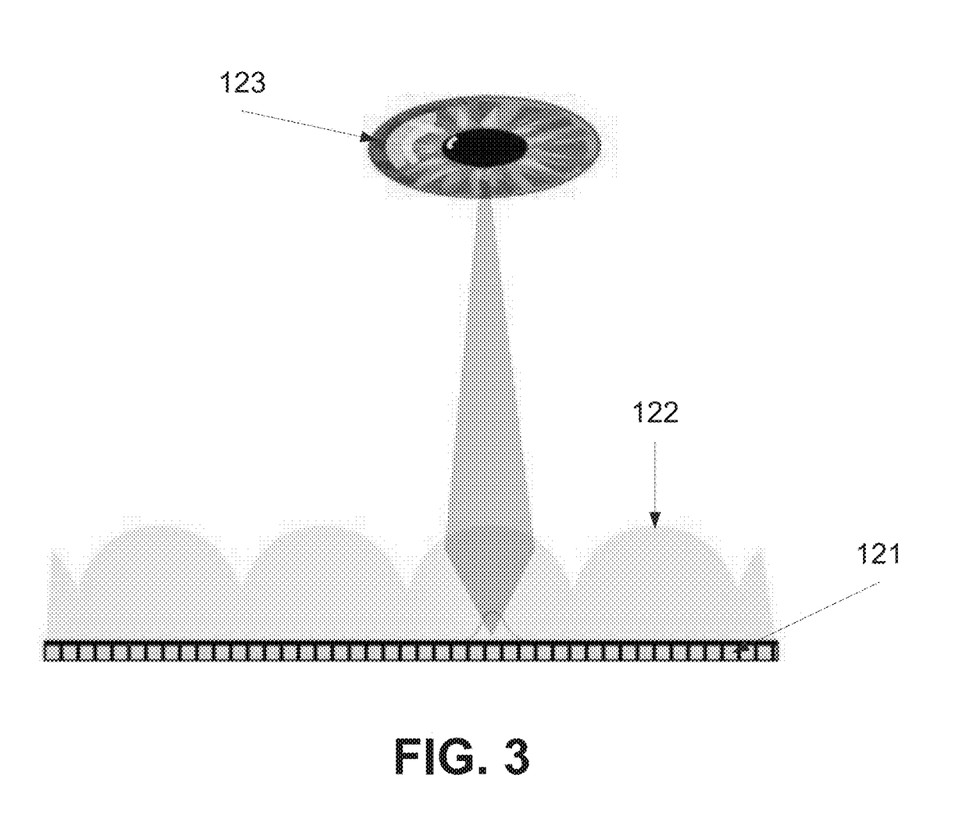
FIG. 3 is a schematic illustration of an ideal lenticular display and/or print.

Another example of the estimated undesired distortion represented by the undesired distortion dataset is a cross-talk effect, namely the perception of one or more unwanted images in addition to the desired one from the user point of view. A methodology to measure the crosstalk effect with a camera in dependence of the viewing angle has been demonstrated in A. Boev, A. Gotchev, K. Egiazarian, "Crosstalk measurement methodology for auto-stereoscopic screens," Proceedings of the International Conference: True-Vision, Capture, Transmission, and Display of 3D Video (3DTV-CON 2007), Kos Island, Greece, pp. 4 p, (2007), which is incorporated herein by reference. The crosstalk effect is often an outcome of imperfections in optical elements of the autostereoscopic display element. FIG. 3 is a schematic illustration of an ideal lenticular display and/or print wherein an interlaced image 121 combines columns from different views and each lenticular lens 122, also known as lenticule, focuses the light coming from a column in the interlaced image to the eye of a viewer 123. In practice, imperfect optics results in cross-talk between the viewed images.

Optionally, the crosstalk effect is mathematically modeled as follows:

$$U_i(x, y, c) = \sum_{j=1}^{K} A(j, i) V_j(x, y, c) \quad \text{Equation 1}$$

where x and y denote spatial coordinates and c denotes a color channel, typically a red, green, blue (RGB) channel. According to Equation 1, when strips of images, also referred to herein as views, $V_1, \ldots, V_k$ are interlaced to be presented via the autostereoscopic display element, are instead of ideally seeing strips of views (where the autostereoscopic display presents subset of strips of a common image as a single continuous image according to the viewing angle) $V_1, \ldots, V_k$, the viewers see strips of views $U_1, \ldots, U_k$ which are mixtures of $V_1, \ldots, V_k$. $U_1, \ldots, U_k$ are optionally modeled in an undesired distortion dataset, a distortion mixing matrix A.

Figure 4A:
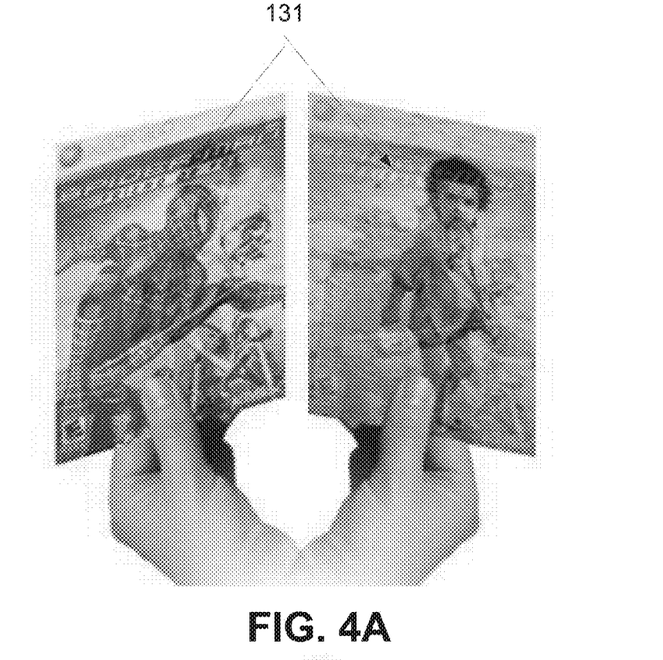
FIGS. 4A and 4B are images of a lenticular article in two different orientations where the images depicted in FIG. 4A exhibit a ghosting effect and the images depicted in FIG. 4B do not.
Figure 4B:
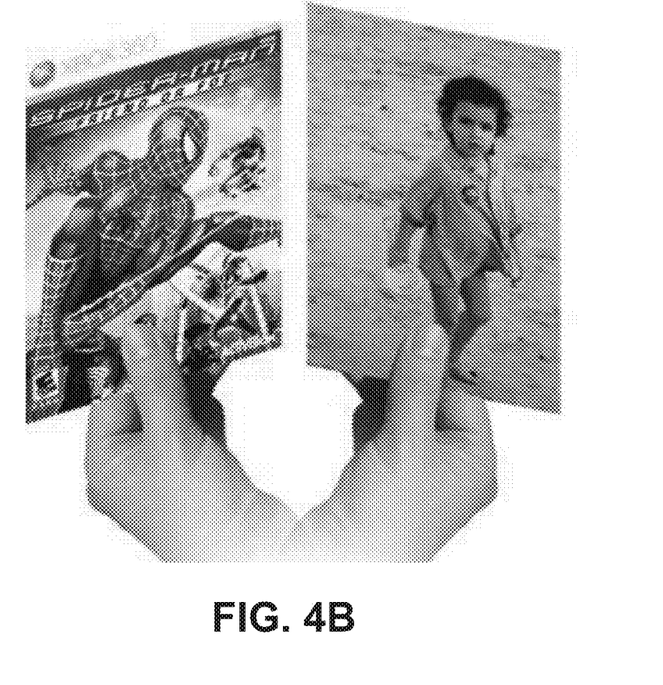

Another example of the estimated undesired distortion represented by the undesired distortion dataset is ghosting. Ghosting usually appear when the autostereoscopic display element is used for creating, together with an interlaced component image, a flip optical illusion or a movement optical illusion, for example as a lenticular article such as a printed card with a presentation that changes from one image to another when tilted. This flip optical illusion or the movement optical illusion is typically implemented by creating an interlaced image combining two (or more) images and attaching it to a lenticular sheet. With ideal optics, each image should be seen clearly. In practice, however, in many cases an observer sees a mix of the two images, as if a ghost of one image appears on top of the other image, as illustrated by numeral 131 of FIG. 4A, which depicts images of a lenticular article having a ghosting effect in two different orientations. See also FIG. 4B, which is an image of the lenticular article in these two different orientations without the ghosting effect.

Now, as shown at 103, a filter for reducing the estimated undesired distortion from the interlaced composite image is calculated as a function of an approximate inverse transform of the provided undesired distortion dataset. The filter may be calculated in advance and stored in a memory of system which uses it for reducing artifacts in real time, for example a streamer, a set top box (STB), and/or any processing unit which apply the filter on a sequence of received images before the presentation thereof on 3D display. Additionally or alternatively, the filter may be calculated in use, optionally according to dynamic information, for example adjusted according to the content of the images. For brevity, dashed lines are used for depicting optional route of using the images as a base for creating the filter and/or as images on which the filter is applied.

Optionally, the filter is calibrated according to user inputs which evaluate the estimated undesired distortion. For example, the user may be presented with a calibration pattern that projected on the autostereoscopic display element. The user may input selections indicative of the estimated undesired distortion, for example by marking areas on the screen and/or estimating blurriness, crosstalk effect, and/or the like. In another example, the user input selections indicative of the estimated undesired distortions while he watches content projected on the autostereoscopic display element. For instance, the user may indicate that the projected content is blurry, crosstalked, and/or the like.

Additionally or alternatively, the filter is dynamically adjusted according to the location of the user in relation to the autostereoscopic display element, for example, the viewing angle of the user. For example, the location of the user may be identified in real using an image sensor and the filter is adjusted and/or calculated to reduce artifacts of the autostereoscopic display element from the point of view of the user. It should be noted that the location dependent artifacts may be calculated in advance, for example during manufacturing and/or calibration.

Additionally or alternatively, the filter is dynamically adjusted according to the illumination environment in front of the autostereoscopic display element, for example, using an illumination sensor. For example, the level of illumination may be identified in real using an illumination sensor and the filter is adjusted and/or calculated to reduce artifacts of the autostereoscopic display element which are more visible in the detected illumination level. It should be noted that the illumination dependent artifacts may be calculated in advance, for example during manufacturing and/or calibration.

As described above, the autostereoscopic display element may be a lenticular element to which the composite image is attached. In such embodiments, the filter may be adjusted according to printing specification, for example according to characteristics of the lenticular element, the paper on which the composite image is printed, and/or the printer. For example, the user may input the above printing specification during a calibration process and the filter is adjusted and/or calculated to reduce artifacts of the autostereoscopic display element which are related to the inputted printing specification. It should be noted that the printing specification dependent artifacts may be calculated in advance, for example during manufacturing and/or calibration.

This allows, as shown at 104, generating a reduced artifact interlaced composite image by applying the filter on the plurality of images and/or on an interlaced composite image generated therefrom. For example, an approximate inverse transform based filter is calculated as follows:

$$\begin{bmatrix} W_1(x, y, c) \\ \vdots \\ W_k(x, y, c) \end{bmatrix} = A^{-1} \begin{bmatrix} V_1(x, y, c) \\ \vdots \\ V_k(x, y, c) \end{bmatrix} \quad \text{Equation 2}$$

where $A^{-1}$ denotes an approximate inverse transform to undesired distortion dataset A, for example matrix A. Optionally, the approximate inverse transform is applied to match pixels in the original views $V_1, \ldots, V_k$. The result is placed in matching pixels in the result views $W_1, \ldots, W_k$.

The approximate inverse transform of A, $A^{-1}$, is designed to minimize the difference between original views $V_1, \ldots, V_k$ and the presentation thereof via the autostereoscopic display element, reducing the effect of the estimated undesired distortion, optionally minimizing the following:

$$\left\| \begin{bmatrix} V_1(x, y, c) \\ \vdots \\ V_k(x, y, c) \end{bmatrix} - A \begin{bmatrix} W_1(x, y, c) \\ \vdots \\ W_k(x, y, c) \end{bmatrix} \right\| = \quad \text{Equation 3}$$

-continued $$\left\| \begin{bmatrix} V_1(x, y, c) \\ \vdots \\ V_k(x, y, c) \end{bmatrix} - AA^{-1} \begin{bmatrix} V_1(x, y, c) \\ \vdots \\ V_k(x, y, c) \end{bmatrix} \right\|$$

The design of approximate inverse transform filter of an undesired distortion dataset A, $A^{-1}$, is optionally application specific, depending on display constraints and/or expected inaccuracies as expressed in Equation 2 above. For example, a display constraint is that $W_1, \ldots, W_k$ are limited to a valid values range, for instance within a range between 0 and 255 in 8-bit displays.

An approximate inverse transform to undesired distortion dataset A, $A^{-1}$, is optionally implemented as a pseudo-inverse of matrix A at a valid range. Optionally, undesired distortion dataset A is generated by assuming, with some displays, that A is a Toeplitz matrix implementing a convolution with, for example, a 2-parameters kernel and testing different kernel parameter sets to find visually-pleasing enhancement result(s), optionally the most visually-pleasing enhancement result(s). The visually-pleasing enhancement result(s) are estimated automatically according to image quality analysis algorithms and/or manually according to one or more human estimator(s). Optionally, the approximate inverse transform is a filter, a simple unsharp-mask operator, followed by clipping values to a range. The unsharp-mask operator is optionally mathematically defined as follows:

$$M(i, j) = s\delta(i, j) - aG\left(\frac{i-j}{\sigma}\right) \quad \text{Equation 4}$$

where G denotes a blur kernel, for example a Standard Gaussian.

It should be noted that mathematical process described above (i.e. in Equation 1) changes as a function of the depicted illumination environment. As the effect of the filter changes as a function of illumination environment, it may cause artifacts when it applied on a composite image that is attached to an autostereoscopic display element that is part of a lenticular element for creating a flip optical illusion having different images with captured in different illumination environments. Optionally, the filter is an illumination insensitive inverse operator that is designated for lenticular element for creating a flip optical illusion. The illumination insensitive inverse operator inserts one or more separator strips between the image strips. The separator views including an inverse of the image strips. For example, for a flip of two images A, B with intensity range 0 . . . 1, a separator S is computed for example as follows:

$$S(x,y,c) = \alpha(1-A(x,y,c)) + (1-\alpha)B(x,y,c) \quad \text{Equation 5}$$

where $\alpha$ denotes a deghosting measure.

Figure 4C:
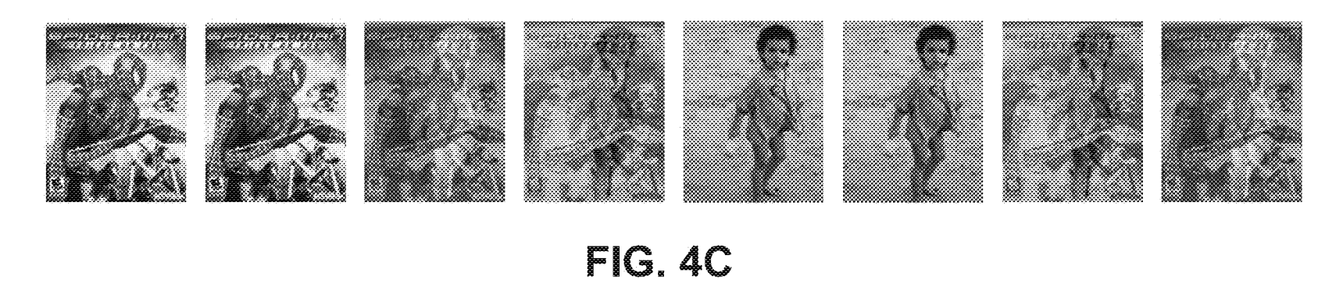
FIG. 4C depicts a set of images which include original images and separator images depicting one of the images which is combined with an inverse version of the other, according to some embodiment of the present invention.

For example, FIG. 4C depicts a set of images which include original images 141, 142 and separator images 143, 144 depicting one of the images which is combined with an inverse version of the other. This allows creating a composite image wherein ghosting artifact is substantially reduced by adding separator views. See also International Patent Application IB2011/054653, filed on Oct. 19, 201, which is incorporated herein by reference.

It should be noted that using the illumination insensitive operator reduces ghosting substantially; however, this also pushes the viewed colors to a grayish tint. To overcome this effect, the images are optionally preprocessed to increase color values of pixels such that the color values in the images of the final print match the colors in the original views. Optionally, in order to calibrate between $\alpha$ and the extent of color correction, a print of a test flip with different pairs of parameters is generated to allow an observer to choose the pair that provides best color fidelity and minimal ghosting from.

As shown at 105, the reduced artifact interlaced composite image may now be outputted. Optionally, the reduced artifact interlaced composite image is outputted to a printer, for instance a lenticular articles printer that prints on the certain autostereoscopic display element (such as a lenticular array). This allows printing the interlaced composite image on a certain lenticular lens sheet and/or on a certain image paper and/or a certain sticker, which is designed to be attached to a lenticular lens sheet and having the respective estimated undesired distortion(s). As used herein, a lenticular lens sheet and an image separating mask may be referred to interchangeably and intend to describe, inter alia, articles such as an array of lenslets, optionally magnifying, optionally cylindrical, designed so that when viewed from a point of view in slightly different angles, light from different segments of a plane parallel to the sheet is directed to the point of view. The lenticular lens sheet has a plurality of parallel lenticular lines each separates between two lenslets of the lenticular lens sheet. The parallel lenticular lines and the lenslets are optionally parallel to a common axis. Optionally, the reduced artifact interlaced composite image is projected, for example for via the certain autostereoscopic display element (such as a 3D display) having the respective estimated undesired distortion(s). Optionally, the strips of the reduced artifact interlaced composite image are optionally adapted to the width of the strips of the certain autostereoscopic display element.

Figure 5:
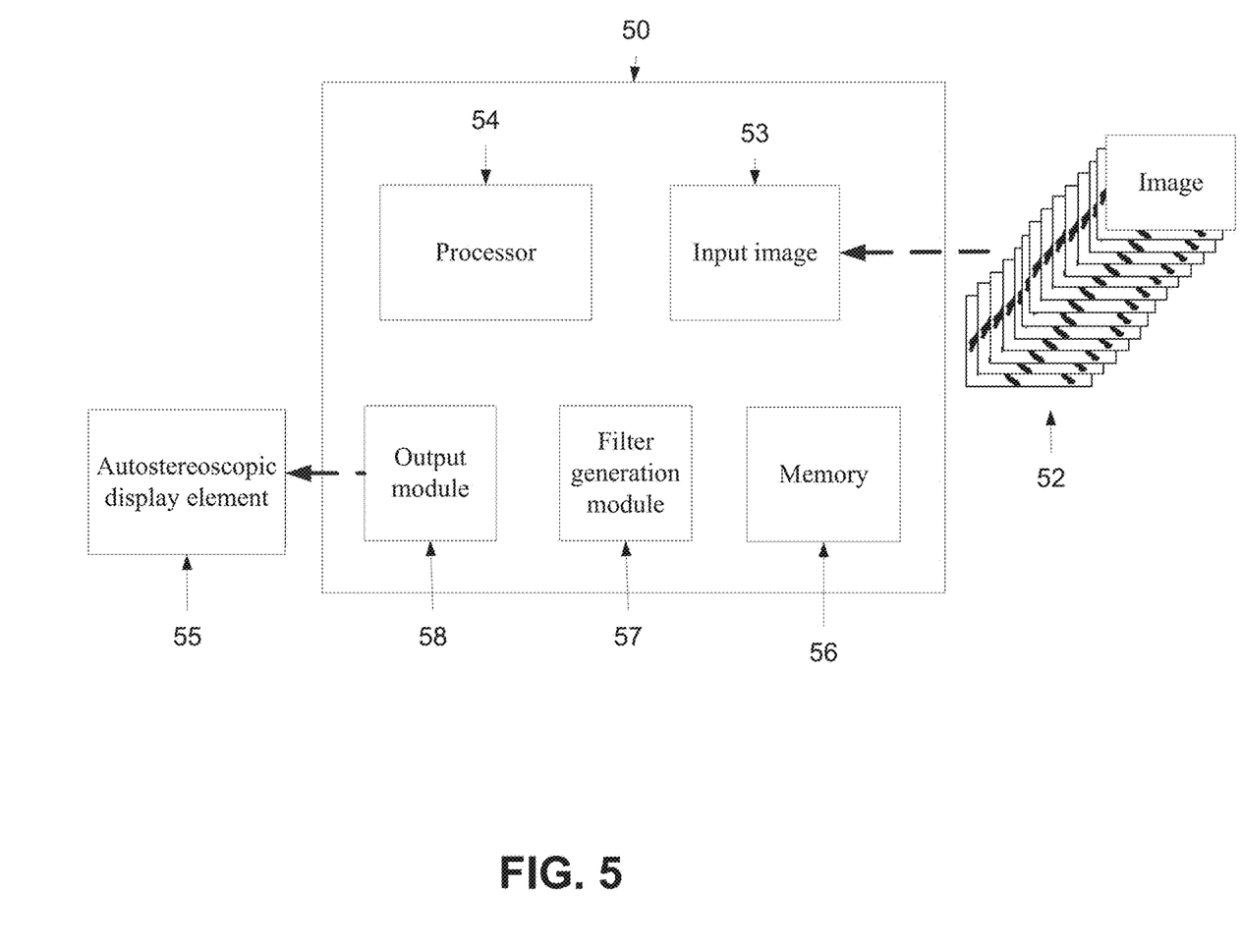
FIG. 5 is a schematic illustration of an apparatus for creating an interlaced composite image for a lenticular printing and/or for projection via an autostereoscopic display element, according to some embodiment of the present invention.

Reference is now made to FIG. 5, which is a schematic illustration of an apparatus 50 for creating an interlaced composite image 51 for a lenticular printing and/or for projection via an autostereoscopic display element, according to some embodiment of the present invention. The apparatus 50 comprises an input unit 53 that receives a number of images, optionally in a sequence 52, for example as described above. As used herein, a sequence means a typical spatial-temporal signal such as a series of sequentially ordered images, a video sequence, or any other series of sequential images. The apparatus 50 comprises a processor 54, an autostereoscopic display element 55, and a memory 56 which stores a filter generated based on an undesired distortion dataset representing an estimated undesired distortion caused by the autostereoscopic display element when a user views a composite image interlacing the received plurality of images via the autostereoscopic display element, for example as described above. The apparatus 50 optionally further comprises a filter generation module 57 which calculates the above filter as a function of an approximate inverse transform of the undesired distortion dataset, for example as described above. The apparatus 50 further comprises an output unit 58, such as a presentation unit or an interface which generates a reduced artifact interlaced composite image by applying the filter on the images and instructs the presentation of the reduced artifact interlaced composite image via the autostereoscopic display element and/or forwards instructions for generating the reduced artifact interlaced composite image for printing. The interface may be a network card and/or a display interface.

It is expected that during the life of a patent maturing from this application many relevant systems and methods will be developed and the scope of the term a processor, an image, a sequence of image, and an autostereoscopic display element is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of creating an interlaced composite image, comprising:
   receiving a plurality of images selected for generating an interlaced composite image by interlacing a plurality of image strips from each said image;
   providing a filter created by a plurality of separating strips calculated by combining between pixel color values of one of said plurality of images and respective pixel color values of an inverse version of another of said plurality of images, said filter is a function of an approximate inverse transform of an undesired distortion dataset representing at least one estimated undesired distortion caused by an autostereoscopic display element when a user views said interlaced composite image via said autostereoscopic display element;
   applying said filter on said plurality of images for generating a reduced artifact interlaced composite image by interlacing said plurality of image strips with said plurality of separating strips; and
   outputting said reduced artifact interlaced composite image.

2. The method of claim 1, wherein said undesired distortion dataset is a matrix having a plurality of values each representing at least one estimated undesired distortion caused by said autostereoscopic display element to a respective pixel of said interlaced composite image.

3. The method of claim 1, wherein said at least one estimated undesired distortion comprises a ghosting artifact.

4. The method of claim 1, wherein said at least one estimated undesired distortion comprises a depth dependent blur.

5. The method of claim 1, further comprising presenting to a user a calibration pattern via said autostereoscopic display and receiving said at least one estimated undesired distortion from said user in response to said presenting.

6. The method of claim 1, further comprising identifying a location of at least one observer in relation to said autostereoscopic display and estimating said at least one estimated undesired distortion according to said location.

7. The method of claim 1, wherein said outputting comprises attaching said interlaced composite image to a lenticular lens sheet having a plurality of lenslets.

8. The method of claim 1, wherein said generating comprises interlacing a plurality of reduced artifact image strips from each said filter applied image and a plurality of separating strips in alternating manner.

9. The method of claim 8, wherein said generating comprises:

creating a reverse intensity image wherein respective pixel color values of a pair of reduced artifact image strips are combined, and extracting said plurality of separating strips from said reverse intensity image.

10. The method of claim 1, wherein said at least one estimated undesired distortion comprises a cross-talk effect.

11. A method of creating an interlaced composite image, comprising:

receiving a plurality of images selected for generating an interlaced composite image by interlacing a plurality of image strips from each said image;

providing a filter created by a plurality of separating strips calculated by combining between pixel color values of one of said plurality of images and respective pixel color values of an inverse version of another of said plurality of images, said filter is a function of an approximate inverse transform of an undesired distortion dataset representing at least one estimated undesired distortion caused by an autostereoscopic display element when a user views said interlaced composite image via said autostereoscopic display element;

identifying an illumination level in proximity to said autostereoscopic display and estimating said at least one estimated undesired distortion according to said illumination level; and applying said filter on said plurality of images for generating a reduced artifact interlaced composite image by interlacing said plurality of image strips with said plurality of separating strips;

outputting said reduced artifact interlaced composite image.

12. The method of claim 11, further comprising receiving printing specification data pertaining to the printing of said reduced artifact interlaced composite image on said autostereoscopic display or on a medium which is attached thereto and estimating said at least one estimated undesired distortion according to said printing specification data.

13. The method of claim 11, wherein said providing comprises calculating said filter as a function an approximate inverse transform and said plurality of images.

14. The method of claim 11, wherein said generating is performed without analyzing the content of said plurality of images.

15. The method of claim 11, wherein said plurality of images is a video sequence and said outputting is performed in real time for three dimensional display of said video sequence.

16. The method of claim 11, wherein said interlaced composite image is projected on a lenticular mask for three dimensional display of content depicted in said plurality of images.

17. The method of claim 11, wherein said outputting comprises at least one of printing said interlaced composite image and projecting said interlaced composite image on an image separating mask.

18. A non-transitory computer readable medium comprising computer executable instructions adapted to perform the method of claim 1.

19. A lenticular imaging article, comprising:

a lenticular lens sheet having a plurality of lenslets; and a reduced artifact interlaced composite image created by interlacing a plurality of image strips from each of a plurality of images and a plurality of separating strips calculated by combining between pixel color values of one of said plurality of images and respective pixel color values of an inverse version of another of said plurality of images;

wherein said reduced artifact interlaced composite image is generated by applying a filter on said plurality of images, said filter being calculated as a function of an approximate inverse transform of a undesired distortion dataset representing at least one estimated undesired distortion caused by said lenticular lens sheet when a user views a composite image interlacing said plurality of images via said lenticular lens sheet.

20. A system having an autostereoscopic display element, comprising:

an autostereoscopic display element;

a memory which stores a filter created by a plurality of separating strips calculated by combining between pixel color values of one of said plurality of images and respective pixel color values of an inverse version of another of said plurality of images, said filter is a function of an approximate inverse transform of an undesired distortion dataset representing at least one estimated undesired distortion caused by said autostereoscopic display element when a user views a composite image interlacing said plurality of images via said autostereoscopic display element; and a processor coupled to the memory for executing:

code instructions for receiving a plurality of images;

code instructions for applying said filter on said plurality of images for generating a reduced artifact interlaced composite image by interlacing said plurality of image strips with said plurality of separating strips, and code instructions for instructing a presentation of said reduced artifact interlaced composite image via said autostereoscopic display element.

* * * * *